United States Patent [19]

Takahashi

[11] Patent Number: 4,730,523

[45] Date of Patent: Mar. 15, 1988

[54] TRANSMISSION RATIO CONTROL SYSTEM FOR AN INFINITELY VARIABLE TRANSMISSION

[75] Inventor: Masahiko Takahashi, Tokyo, Japan

[73] Assignee: Fuji Jukogyo Kabushiki Kaisha, Tokyo, Japan

[21] Appl. No.: 764,896

[22] Filed: Aug. 12, 1985

[30] Foreign Application Priority Data

Aug. 17, 1984 [JP] Japan ................................. 59-172055

[51] Int. Cl.⁴ ............................................. B60K 41/12
[52] U.S. Cl. ......................................... 74/868; 74/877
[58] Field of Search ................. 74/868, 869, 867, 865, 74/877, 863, 864, 752 C; 474/11, 12, 18, 28

[56] References Cited

U.S. PATENT DOCUMENTS

| | | | |
|---|---|---|---|
| 3,893,344 | 7/1975 | Dantgraber et al. | 74/867 |
| 4,369,675 | 1/1983 | van Deursen | 474/18 X |
| 4,400,164 | 8/1983 | Cadee | 474/12 |
| 4,467,674 | 8/1984 | van Deursen et al. | 74/867 |
| 4,475,416 | 10/1984 | Underwood | 74/868 |
| 4,534,243 | 8/1985 | Yokoyama et al. | 74/867 X |
| 4,579,021 | 4/1986 | Yamamuro et al. | 74/865 |
| 4,584,909 | 4/1986 | Abo et al. | 74/868 |

FOREIGN PATENT DOCUMENTS 2752322  6/1978  Fed. Rep. of Germany ........ 474/18

Primary Examiner—Lawrence Staab
Assistant Examiner—David Novais
Attorney, Agent, or Firm—Martin A. Farber

[57] ABSTRACT

A system for an infinitely variable belt-drive transmission for an engine comprises a primary pulley having a hydraulically shiftable disc, a secondary pulley having a hydraulically shiftable disc, a belt engaged with both pulleys, and a hydraulic circuit. A transmission ratio control valve having a spool is provided to be responsive to engine speed for controlling the oil and for shifting the disc of the primary pulley to change the transmission ratio. Pitot pressure dependent of the engine speed is applied to the spool to shift it against a spring, the force of which is determined by the depression of an accelerator pedal. The load on the spring is increased to provide a downshifting operation of the transmission, when the large transmission ratio range is selected.

9 Claims, 6 Drawing Figures

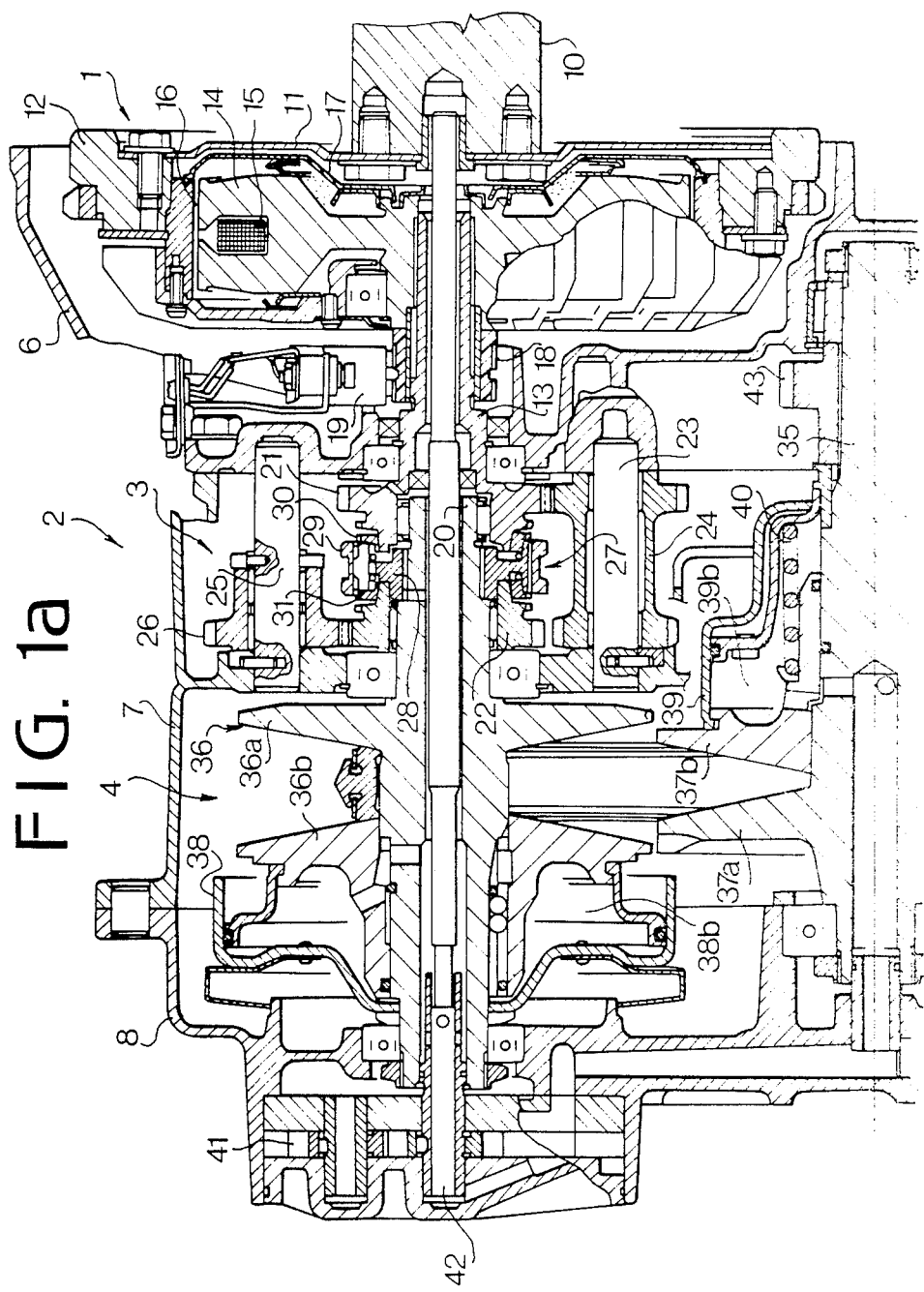

TRANSMISSION RATIO CONTROL SYSTEM FOR AN INFINITELY VARIABLE TRANSMISSION

BACKGROUND OF THE INVENTION

The present invention relates to a transmission control system for an infinitely variable belt-drive automatic transmission for a vehicle, and particularly to a system which improves the transmission characteristic during acceleration in a drive range (D-range).

The infinitely variable belt-drive transmission comprises an endless belt running over a drive pulley and a driven pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil supplied to the servo devices.

The primary pulley has a pitot pressure generating device as an engine speed sensor for producing pitot pressure dependent on engine speed. The pitot pressure increases with an increase of engine speed and is applied to one axial end of the spool of each valve to bias the spool. The pressure regulator valve is so arranged as to decrease the line pressure of a hydraulic circuit with an increase of the pitot pressure and a decrease of the transmission ratio. At the other end of the spool of the transmission ratio control valve, a spring load is applied which is dependent on the depression position of an accelerator pedal of a motor vehicle. Thus, the spool of the transmission ratio control valve is positioned at a location where the pitot pressure and the spring load balance so as to decide the transmission ratio depending the engine operating conditions. At the idling operation of the engine, line pressure is regulated at the highest pressure by the regulator valve and the line pressure is not applied to the servo device of the drive pulley. Accordingly, the transmission ratio is set at the highest value. Under such a condition, when engine speed increases with the depression of the accelerator pedal, the motor vehicle is started by the engagement of an electromagnetic clutch. When the engine speed reaches a predetermined speed (for example a point B in FIG. 4), the spool of the transmission ratio control valve is shifted in the upshift direction by increased pitot pressure, so that the transmission ratio starts to change to decrease the ratio (upshifting). If engine speed is kept constant, the transmission ratio continuously decreases. Accordingly, vehicle speed increases, even if the accelerator pedal is not depressed. At the lowest transmission ratio, when the depression of the accelerator pedal is decreased, the vehicle speed decreases at the lowest transmission ratio with decrease of the engine speed. When the engine speed reaches a predetermined low speed, the transmission ratio starts to a change to higher ratio (downshift). Accordingly, if the engine speed is kept constant, the vehicle speed decreases.

As described above, the vehicle speed changes at a constant engine speed by automatic upshifting and downshifting of the transmission.

However, such a constant engine speed during the transmission changing operation is unsuitable for driving the motor vehicle. More particularly, the engine speed is comparatively high at a high transmission ratio, and is too low to actively drive the motor vehicle at a low transmission ratio. Japanese Patent Laid Open 56-66553 (U.S. Pat. No. 4,400,164) discloses an infinitely variable transmission which may resolve the above problems. The transmission is characterized by a regulator plunger (67 FIG. 2 of this U.S. patent) slidably mounted in the spool of the transmission ratio control valve and a regulator spring provided between one end of the regulator plunger and one end of an actuating rod which is operatively connected to an accelerator pedal of a motor vehicle so as to urge the regulator plunger in accordance with the depression of the pedal. The regulator plunger has a flange subjected to the line pressure controlled by the regulator valve.

When the transmission is upshifted, the regulator plunger is projected by the decrease of the line pressure to increase the load of the regulator spring. Accordingly, the pitot pressure for shifting the spool of the control valve in the upshifting direction is elevated. Consequently, unless the engine speed is increased, the transmission is not upshifted. Thus, the transmission characteristic can be shown by lines A-B-C-D-E-A in FIG. 4. In the this figure, line l is the largest transmission ratio line and line h is the lowest ratio line. The transmission is upshifted with an increase of the engine speed. However, since the increase of load of the regulator spring is dependent on the line pressure, the engine speed does not increase in proportion to the increase of the vehicle speed as shown by the line $m_1$. Accordingly, if the upshift starting point B is set at a position where the largest torque of the engine is obtained, the highest engine speed at point C does not reach the largest horsepower speed.

On the contrary, since the regulator spring is adjusted so that the largest horsepower can be obtained at point C, the engine speed at point B becomes extremely high, which results in a decrease of acceleration characteristic of the vehicle.

SUMMARY OF THE INVENTION

The object of present invention is to provide a control system for an infinitely variable transmission in which engine speed is linearly increased in order to upshift the transmission.

BRIEF DESCRIPTION OF DRAWINGS

FIGS. 1a and 1b are cross sectional views showing an infinitely variable belt-drive transmission to which the present invention is applied;

DETAILED DESCRIPTION OF THE PREFERRED EMBODIMENT

Figure 1B:
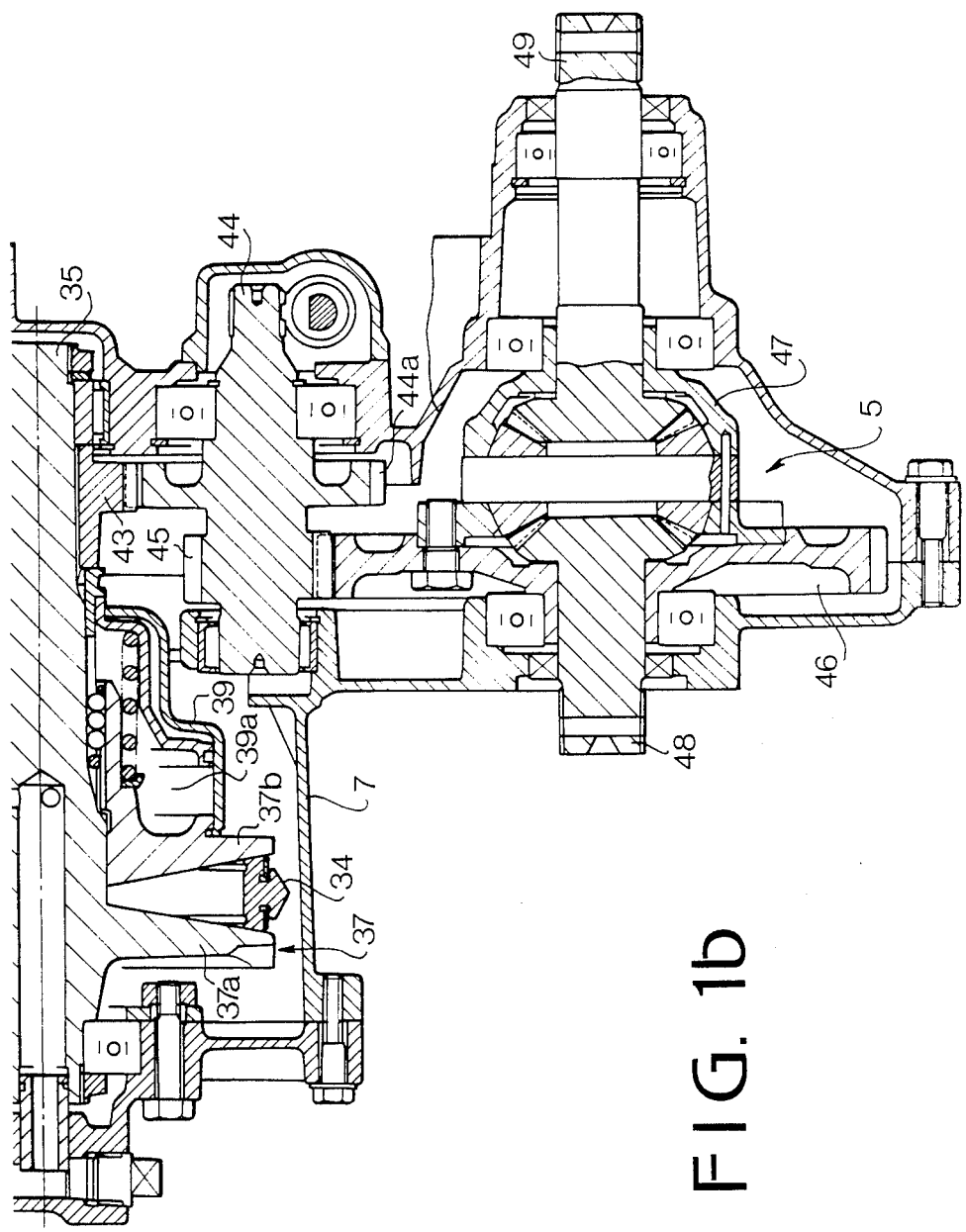

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22. (The idle gear 26 is illustrated in development in FIG. 1a for the convenience of the illustration).

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving position (D range).

When the sleeve 29 is engaged with the gear 22, the input shaft 13 is connected to the main shaft 20 through gears 21, 24, 26 and 22 to provide a reverse driving position (R range).

The main shaft 20 has an axial hole in which there is mounted an oil pump driving shaft 42 connected to the crankshaft 10. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit.

The oil pump 41 is driven by the shaft 42 connected to the crankshaft 10.

A fixed conical disc 37a of the driven pulley 37 is formed on the output shaft 35 opposite the movable disc 36b and a movable conical disc 37b is slidably mounted on the shaft 35 opposite the disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of driving wheels of the vehicle through a differential 47.

The pressure oil control circuit is responsive to vehicle speed, engine speed and throttle valve position for controlling the oil from the oil pump 41 to the servo devices 38 and 39 so as to move the discs 36b and 37b. Thus, the transmission ratio is infinitely changed.

Figure 2A:
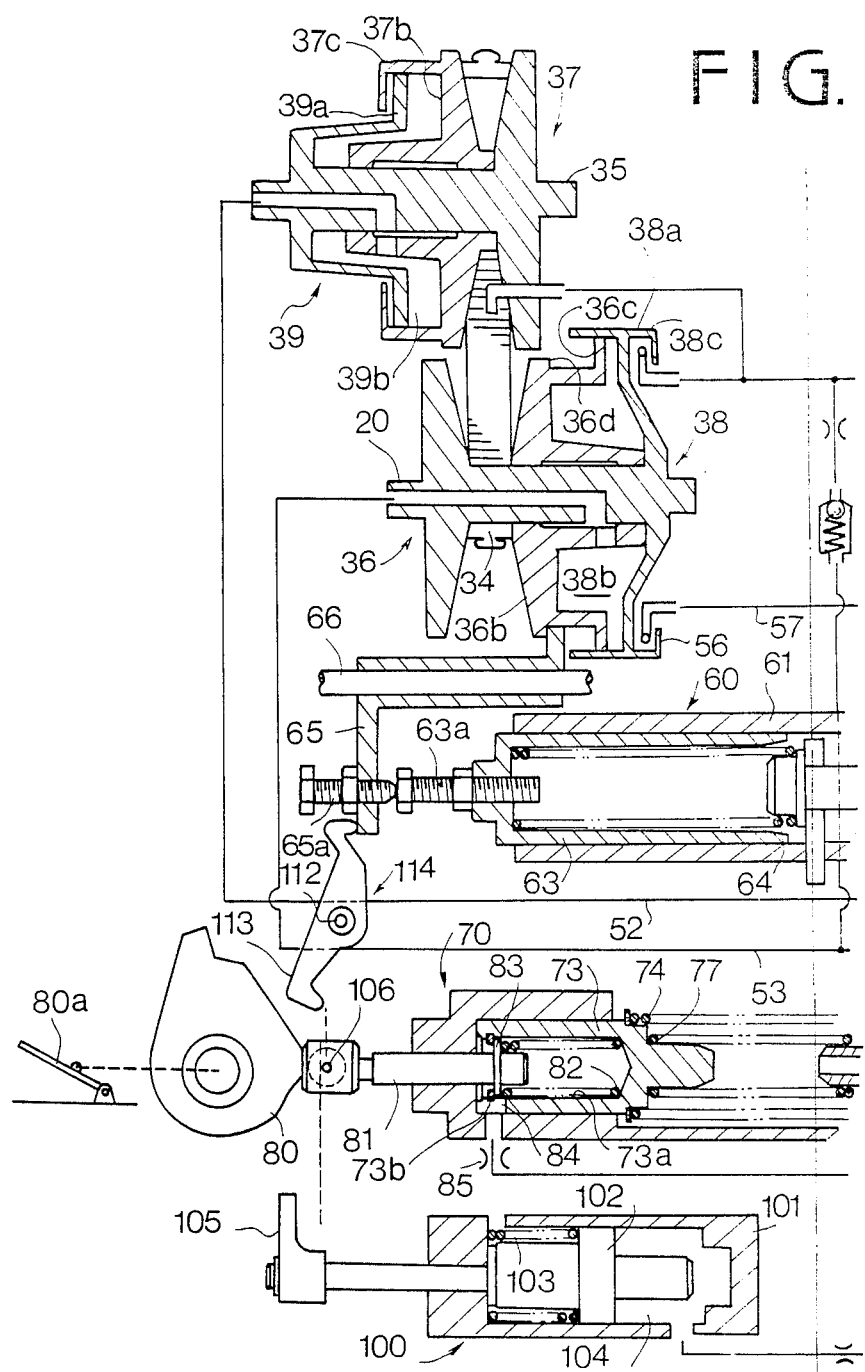
FIGS. 2a and 2b are schematic diagrams showing a control system of the transmission.
Figure 2B:
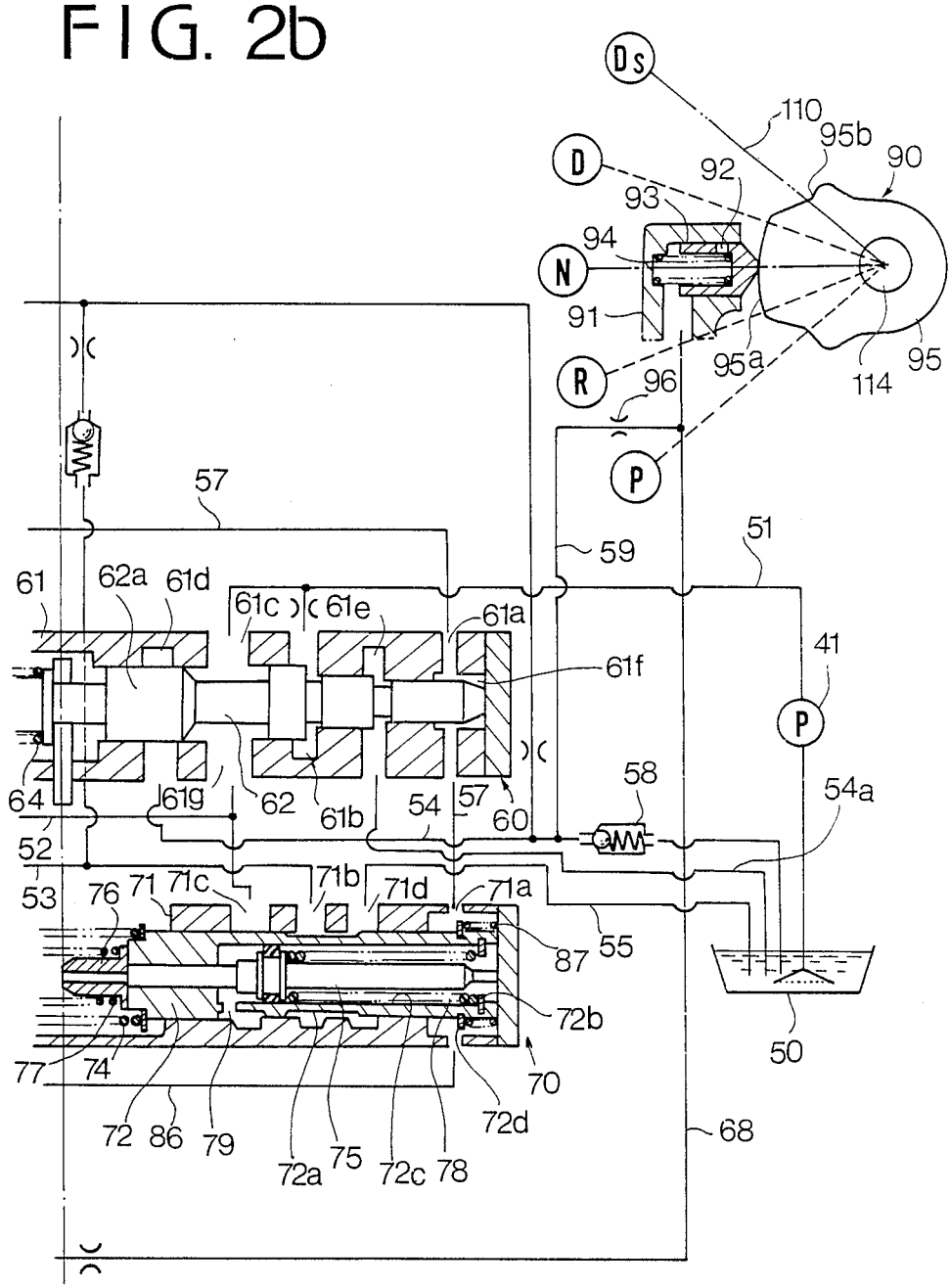

FIGS. 2a and 2b show a hydraulic control circuit. In the servo device 38 of the drive pulley 36, a cylinder 38a integrally formed on the main shaft 20 is engaged with a piston 36c formed on the movable disc 36b, forming a drive pulley servo chamber 38b, into which line pressure is applied. Also, in the other servo device 39 of the driven pulley 37, a cylinder 37c formed integrally with the movable conical disc 37b is engaged with a piston 39a formed on the output shaft 35, forming a driven pulley servo chamber 39b. The movable disc 36b has a pressure receiving surface, the area of which is larger than the corresponding area of the movable disc 37b. Oil in an oil reservoir 50 is supplied to a pressure regulator valve 60 through a passage 51 by pump 41. An oil passage 52 from a port 61g of the pressure regulator valve 60 is communicated with the driven pulley servo chamber 39b and adapted to be communicated with the drive pulley servo chamber 38b through a transmission ratio control valve 70 and a passage 53 as described hereinafter. Oil flows back to the oil reservoir 50 through drain passages 54 and 55 which are in communication with the valves 60 and 70, respectively. The main pulley cylinder 38a has an annular inside groove 38c in which a rotation speed sensor 56 in the form of a pitot tube is provided for measuring the speed of the oil in the groove, that is the speed of the main shaft 20 which varies dependent on the engine speed. The pitot pressure produced by the rotation speed sensor 56 as a pitot tube is applied to the valves 60 and 70 through a passage 57.

A ball check valve 58 is provided in the drain passage 54 for the pressure regulator valve 60, and the passage is communicated with a select position detecting valve 90 upstream of the check valve 58 through a passage 59 and further with an actuator 100 for the transmission ratio control valve 70 through a passage 68.

The pressure regulator valve 60 comprises a valve body 61, a spool 62, a spring 64 provided between a spring retainer 63 and one end of the spool 62 for urging the spool 62 to the right. A sensor shoe 65 for detecting the actual transmission ratio is slidably mounted on a lubricating oil pipe 66 which is parallel with the axis of the spool 62. A bolt 65a secured to an end of the sensor shoe 65 engages an end of a bolt 63a secured to the spring retainer 63, and the other end of the sensor shoe 65 engages the outside periphery 36d of the movable disc 36b. Thus, the position of the movable disc 36b, which means the transmission ratio during the operation is transmitted to the spool 62 through the spring 64. At the end of the valve body 61, opposite to the spring 64, pitot pressure is applied to an end chamber 61f through the oil passage 57 and a port 61a, and pump oil pressure is applied to a chamber 61b through the passage 51. The passage 51 is communicated with the passage 52 through ports 61c and 61g. A chamber 61e is provided between the chambers 61f and 61b for preventing leakage of the oil from affecting the pitot pressure. Chambers 61d and 61e are communicated with the oil reservoir 50 through drain passages 54 and 54a. The chamber 61d is communicated with the port 61g through a chamber formed at a land 62a of the spool 62 so that the line pressure can be regulated.

Thus, the spool 62 is applied with the pitot pressure and pump oil pressure so as to be moved in the direction to open the chamber 61d, whereas the elastic force of the spring 64 corresponding to the transmission ratio detected by the sensor shoe 65 urges the spool 62 in the opposite direction to close the port 61d. Accordingly, high line pressure is generated at the port 61c at a low engine speed with a large transmission ratio. The sensor shoe 65 is moved to the left in FIG. 2a as the transmission ratio decreases, reducing the force of the spring 64 to lower the line pressure. The line pressure exerts on the belt 34 a proper force dependent on the transmission ratio so as not to cause the belt to slip on the pulleys.

The transmission ratio control valve 70 comprises a valve body 71, a spool 72, an operating plunger 73, and a spring 74 provided between the spool 72 and the plunger 73. A chamber 71a formed at an end of the valve body 71 is communicated with the passage 57 to be applied with the pitot pressure. The control valve 70 further comprises a port 71b communicated with passage 53, a port 71c communicated with the passage 52, a port 71d communicated with the passage 55, an annular groove 72a formed on the spool 72 so as to communicate the ports 71b and 71c or 71b and 71d for supplying or discharging line pressure to or from the drive pulley servo chamber 38b via passage 53 in dependency on the position of the spool 72. A regulator spring 77 is provided between the operating plunger 73 and a retainer 76 securely mounted on a projecting end of a regulator plunger 75 which is slidably provided in an axial cavity 72c in the spool 72. A spring 78 is provided between a flange of the plunger 75 and a retainer 72b of the spool 72. The force of the regulator spring 77 is decided by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 83 of the rod 81 is axially slidably mounted in the wall of the cavity 73a. A small spring 82 is provided between the flange 83 and the plunger 73, and the flange 83 engages with a snap ring 73b secured to the plunger. The cavity 73a is applied with the pitot pressure through a port 84 and a passage 86 having an orifice 85 and communicated with the chamber 71a. A spring 87 is provided between a snap ring 72d of the spool 72 and the valve body 71 to adjust the load on the spring 82. An end of the rod 81 engages with a cam 80 which is operatively connected to an accelerator pedal 80a of the vehicle so as to be rotated in dependency on the depression of the pedal.

When the spool 72 is moved, as described hereinafter, by the pitot pressure to communicate the port 71b with port 71c, the line pressure is applied to the servo chamber 38b of the drive pulley 36 to upshift the transmission. On the other hand, when the port 71b communicates with the port 71d, the chamber 38d is drained to downshift the transmission.

The selecting position detecting valve 90 comprises a valve body 91, a valve 93 having a drain aperture 92 which is slidably mounted in the valve body 91, a spring 94 for pressing the valve 93 against a cam 95 which rotates according to the position of a selector lever 110. The cam 95 has a lobe 95a which is corresponding to D, N, R range positions, and indentations 95b formed in both sides of the lobe 95a, corresponding to the P, Ds range positions. At the D, N, R range positions, the lobe 95 pushes the valve 93 in the direction to close the drain aperture 92, so that actuating oil pressure is built up. At the P, Ds range positions, the valve 93 moves outwards to open the drain aperture 92, so that the lubricating oil pressure in the passages 54, 59 is lowered. At that time the oil pressure decreases gradually, because of an orifice 96 provided in the oil passage 59.

The actuator 100 comprises a cylinder 101, a piston 102 which is slidably mounted in the cylinder 101, and a spring 103 for biasing the piston 102 toward a piston chamber 104 to which actuating oil pressure is applied through the passage 68. Further, a hook portion 105 formed at the outer end of the piston is engageable with a pin 106 on the rod 81 of the transmission ratio control valve 70. At the P range or Ds range, since no actuating oil pressure exists, piston 102 presses the rod 81 to the right in FIG. 2a, controlling the transmission zone to the side of high engine revolution. Thus, although the acceleration pedal at Ds range is released, the system causes downshifting of the transmission, so that engine braking occurs.

Further, a correcting device 114 is provided between the sensor shoe 65 and the valve 70 in order to correct the characteristic in the D range. The device comprises a correction lever 113 rotatably supported by a pin 112, one end of which engages with the sensor shoe 65 and the other end is adapted to be engaged with the pin 106 of the rod 81.

In operation, while the vehicle is at a stop, the secondary pulley servo chamber 39b is supplied with the line pressure adjusted by the pressure regulator valve 60 through the passages 51, 52, and the drive pulley servo chamber 38b is drained, since the spool 72 is at the right end position by the spring 74. Thus, in the pulley and belt device 4 of the infinitely variable belt-drive transmission 2, the driving belt 34 engages with the driven pulley 37 at a maximum running diameter to provide the largest transmission ratio (low speed stage). When D range is selected, the output shaft 35 and the main shaft 20 are connected to each other in the selector device 3 by the selector lever. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to the axles of the driving wheels through the final reduction device 5. Thus, the vehicle is started.

Figure 3:
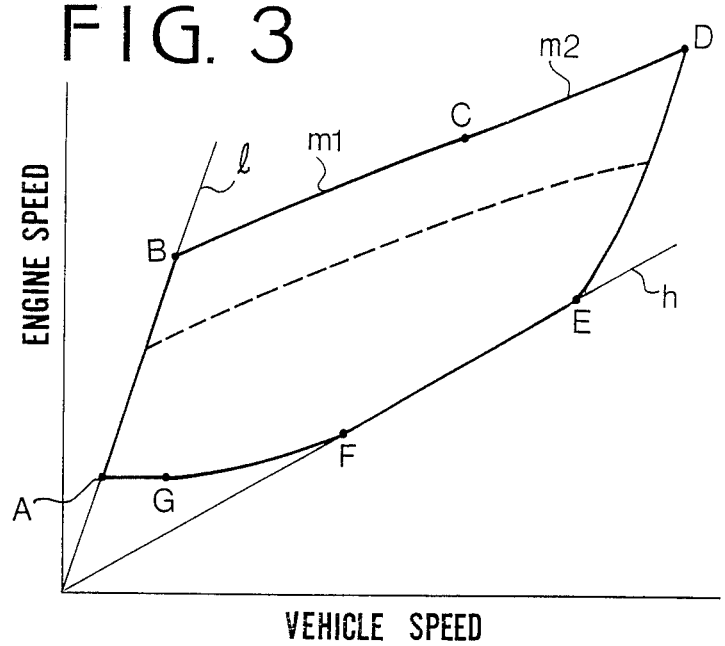
FIG. 3 is a graph showing the transmission characteristic of the system according to the present invention.
Figure 4:
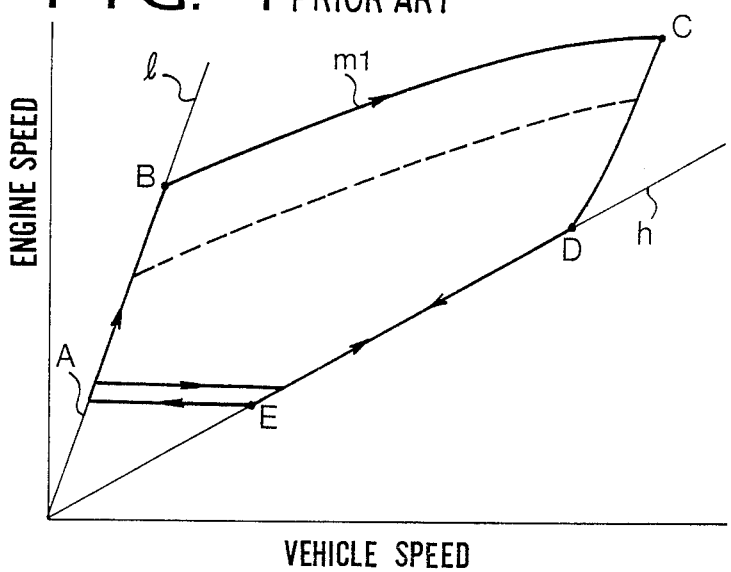
FIG. 4 is a graph showing the transmission characteristic of a conventional control system.

At that time, the line pressure is at the highest value by the pressure regulator valve 60. The pitot pressure by the speed sensor 56 increases with increase of the engine speed. On the other hand, since the line pressure is at a high value, the plunger 75 is at the retracted position, so that the load on spring 77 is zero. The cam 80 pushes the rod 81 in dependency on the depression of the accelerator pedal, which causes the plunger 73 to be moved to the right through spring 82 at the moment that rod 81 moves to the right. The movement of the plunger 73 causes the spool 72 to be moved to the right through the spring 74. Engine speed increases from a point A and along the largest transmission ratio line l in FIG. 3, so that the pitot pressure increases. When the pitot pressure exceeds a predetermined value, the spool 62 of the pressure regulator valve 60 is shifted to the left to communicate the port 61c with chamber 61d to decrease the line pressure. On the other hand, when the force dependent on the pitot pressure becomes higher than the force of the spring 74, the plunger 73 moves to the right until the snap ring 73b touches the flange 83, and the plunger 75 being moved to the left by the pitot pressure so that the spool 72 is moved to the left depending on the movement of the plunger 75 to communicate the port 71b with the port 71c. Accordingly the line pressure is applied to the chamber 38b to move the disc 36b. Thus, the transmission ratio begins to change to a small value. The transmission ratio varies from a point B on the largest transmission ratio line l, in dependency on driving conditions of the vehicle.

Since the line pressure is supplied to the chamber 38b, the distance between the conical discs of the drive pulley 36 gradually decreases, so that the running diameter of driving belt 34 increases gradually to reduce the transmission ratio. When the disc 36b moves to the left (FIG. 2a), the sensor shoe 65, spring retainer 63 and spool 62 are also moved to the left. Accordingly, the port 61g communicates with the port 61d to discharge the oil to the oil reservoir 50. Thus, the line pressure decreases, which causes the plunger 75 to move to the left, increasing the load on the spring 77. Accordingly, in order to upshift the transmission, the pitot pressure, that is the engine speed must become higher than the increment of the load on the spring 77. Thus, line $m_1$ gradually rises in accordance with the increase of the engine speed and vehicle speed. When the transmission ratio reaches a predetermined value (point C in FIG. 3), sensor shoe 65 engages with the end of the correcting lever 113 and causes the other end of the lever to shift the rod 81 to the right. Accordingly, the load of the springs 74 and 77 is further increased, so that the engine speed must be further increased. Thus, line $m_2$ increases linearly from the point C, having substantially the same increment of the line $m_1$.

When the accelerator pedal is released, i.e. when decelerating, the operating plunger 73 in the transmission control valve 70 moves to the most retracted position, and hence the load on the spring 74 becomes minimum, so that the spool 72 is shifted to the left by the pitot pressure, whereby the line pressure is applied to the drive pulley servo chamber 38b to keep the transmission ratio minimum. Thus, engine speed reduces from point D and along the line h of the minimum transmission ratio together with vehicle speed. When the engine speed decreases to a low value, the pitot pressure decreases, so that the spring 74 acts to shift the spool 72 to the right. Thus, the drive pulley servo chamber 38b is drained, so that transmission is downshifted from a point F.

Following is the explanation of the transmission control operation in the Ds range. When the Ds range is selected, the drain aperture 92 opens by the valve 90, thereby draining the chamber 104 of the actuator 101. Accordingly, the piston 102 is moved to the right by the spring 103, causing the hook 105 to engage with the pin 106 on the rod 81 to move the rod to the right. Thus, the operating plunger 73 is shifted to the right to increase the load on the springs 74 and 77. Accordingly, the spool 72 is shifted to the right, so that the transmission ratio increases.

From the foregoing it will be understood that engine speed must be linearly increased in order to accelerate the motor vehicle during an upshift operation of the transmission, so that the largest torque and largest horsepower of the engine can be effectively used.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for an infinitely variable transmission for a vehicle powered by an internal combustion engine, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the control system including a hydraulic circuit having a pump for supplying oil, detecting means for producing a first pressure dependent on engine speed, a transmission ratio control valve having a first spool responsive to the first pressure for controlling the oil for shifting the disc of the drive pulley to change the transmission ratio of the transmission, and a pressure regulator valve having a second spool responsive to the transmission ratio for decreasing line pressure of the hydraulic circuit with a decrease of the transmission ratio, and a selector lever for selecting driving ranges including a small transmission ratio range and a large transmission ratio range, the improvement comprising:

an operating plunger axially movably disposed in the transmission ratio control valve;

a spring provided between the first spool of the transmission ratio control valve and the operating plunger;

first means for shifting the operating plunger in dependency on depression of an accelerator pedal of the vehicle so as to shift the first spool via said spring against the first pressure;

a select range detecting device for detecting the selection of the large transmission ratio range and producing a selection signal; and second means responsive to the selection signal for shifting the operating plunger against the spring so as to increase the load on the first spool of the transmission ratio control valve, so that that value of the first pressure which value is necessary for shifting the first spool in an upshifting direction of the transmission is increased.

2. The control system according to claim 1 wherein first means comprises a cam operatively connected to the accelerator pedal and a rod following the rotation of the cam to shift the operating plunger.

3. In a control system for an infinitely variable transmission for a vehicle powered by an internal combustion engine, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the control system including a hydraulic circuit having a pump for supplying oil, detecting means for producing a first pressure dependent on engine speed, a transmission ratio control valve having a first spool responsive to the first pressure for controlling the oil for shifting the disc of the drive pulley to change the transmission ratio of the transmission, and a pressure regulator valve having a second spool responsive to the transmission ratio for decreasing line pressure of the hydraulic circuit with a decrease of the transmission ratio, and a selector lever for selecting driving ranges including a small transmission ratio range and a large transmission ratio range, the improvement comprising:

an operating plunger axially movably disposed in the transmission ratio control valve;

a spring provided between the first spool of the transmission ratio control valve and the operating plunger;

first means for shifting the operating plunger in dependency on depression of an accelerator pedal of the vehicle so as to shift the first spool via said spring against the first pressure;

a select range detecting device for detecting the selection of the large transmission ratio range and producing a selection signal;

second means responsive to the selection signal for increasing the load on the spring so as to shift the first spool of the transmission ratio control valve for shifting the disc of the drive pulley to change the transmission ratio into a downshift direction;

the second means comprises an actuator cylinder, an actuator piston provided in the actuator cylinder and operatively connected to said operating plunger, and the hydraulic circuit including an oil passage for supplying oil into the actuator cylinder; and the select range detecting device comprises a cam operatively connected to the selector lever so as to be rotated by the lever, a valve provided in the oil passage and operated by the cam at the selection of the large transmission ratio range to shift the actuator piston.

4. In a control system for an infinitely variable transmission for a vehicle powered by an internal combustion engine, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the control system including a hydraulic circuit having a pump for supplying oil, detecting means for producing a first pressure dependent on engine speed, a transmission ratio control valve having a first spool responsive to the first pressure for controlling the oil for shifting the disc of the drive pulley to change the transmission ratio of the transmission, and a pressure regulator valve having a second spool responsive to the transmission ratio for decreasing line pressure of the hydraulic circuit with a decrease of the transmission ratio, the improvement comprising:

an operating plunger axially movably disposed in the transmission ratio control valve;

a spring provided between the first spool of the transmission ratio control valve and the operating plunger;

first means for shifting the operating plunger in dependency on depression of an accelerator pedal of the vehicle so as to shift the first spool via said spring against the first pressure;

second means responsive to the decreasing line pressure for increasing load on said spring in a direction opposing downshifting of the transmission for upshifting the transmission along a transmission ratio curve of engine speed vs. vehicle speed; and third means for upshifting the transmission along a linearly decreasing transmission ratio line of engine speed vs. vehicle speed below a predetermined transmission ratio of the transmission, said linearly decreasing transmission ratio line substantially has the same slope as that of said transmission ratio curve above said predetermined transmission ratio during the upshifting.

5. The system according to claim 4, wherein said third means presses said operating plunger in said transmission ratio control valve such that the transmission ratio along said linearly decreasing transmission ratio line decreases below said predetermined transmission ratio.

6. The system according to claim 5, wherein the third means is a sensor shoe operatively connected to one of said discs of said transmission and operatively pressing against said operating plunger when the transmission ratio is below said predetermined transmission ratio.

7. The system according to claim 6, wherein the third means during the upshifting continuously decreases said transmission ratio along said linearly decreasing transmission ratio line below said predetermined transmission ratio.

8. In a control system for an infinitely variable transmission for a vehicle powered by an internal combustion engine, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the control system including a hydraulic circuit having a pump for supplying oil, detecting means for producing a first pressure dependent on engine speed, a transmission ratio control valve having a first spool responsive to the first pressure for controlling the oil for shifting the disc of the drive pulley to change the transmission ratio of the transmission, and a pressure regulator valve having a second spool responsive to the transmission ratio for decreasing line pressure of the hydraulic circuit with a decrease of the transmission ratio, and a selector lever for selecting driving ranges including a small transmission ratio range and a large transmission ratio range, the improvement comprising:

an operating plunger axially movably disposed in the transmission ratio control valve;

a spring provided between the first spool of the transmission ratio control valve and the operating plunger;

first means for shifting the operating plunger in dependency on depression of an accelerator pedal of the vehicle so as to shift the first spool via said spring against the first pressure;

a select range detecting device for detecting the selection of the large transmission ratio range and producing a selection signal; and second means responsive to the selection signal for increasing the load on the spring so as to shift the first spool of the transmission ratio control valve for shifting the disc of the drive pulley to change the transmission ratio into a downshift direction.

9. The system according to claim 8, wherein the second means comprises an actuator cylinder, an actuator piston provided in the actuator cylinder and operatively connected to said operating plunger, and the hydraulic circuit including an oil passage for supplying oil into the actuator cylinder;

the select range detecting device comprises a cam operatively connected to the selector lever so as to be rotated by the lever, a valve provided in the oil passage and operated by the cam at the selection of the large transmission ratio range to shift the actuator piston.

* * * * *